Jan. 7, 1958  J. D. BRYAN  2,819,461
RADAR ACQUISITION SYSTEM
Filed Nov. 22, 1950  4 Sheets-Sheet 3

INVENTOR
JAMES D. BRYAN,
BY
ATTORNEY

Jan. 7, 1958 J. D. BRYAN 2,819,461
RADAR ACQUISITION SYSTEM
Filed Nov. 22, 1950 4 Sheets-Sheet 4

INVENTOR
JAMES D. BRYAN,
BY
ATTORNEY

United States Patent Office 2,819,461
Patented Jan. 7, 1958

2,819,461

RADAR ACQUISITION SYSTEM

James D. Bryan, Baltimore, Md., assignor to The Glenn L. Martin Company, Middle River, Md., a corporation of Maryland Application November 22, 1950, Serial No. 197,096

8 Claims. (Cl. 343—11)

This invention relates generally to fire control systems and more particularly to an automatic search and track radar having means whereby three dimensional target position data is presented to the operator during acquisition; acquisition being defined as the sequence of operations between sighting a target and locking on that target.

The ordinary radar for fire control systems, presents only two coordinates of target position to the operator. These may be selected from the three space coordinates known as range, azimuth and elevation. Since target selection is made primarily on the basis of range, this coordinate is vitally important to the operator and is nearly always one of the two which are presented. The other coordinate which can be shown in a two dimensional system is either azimuth or elevation, the selection of one or the other being dependent upon the particular design requirements.

In operating such a system the target is first selected in the search function. Then the operator, using the two coordinates presented to him, manually drives the scanner to the indicated target elevation or azimuth position and manipulates the controls to move the scanner along the path of the unknown coordinate until the target is obtained. During this acquistion process, the target position data by which the operator is guided is the position data given at the end of the search function, made necessary by the fact that the signal beam does not intersect the target during acquisition until the target is located. The relative position of a fast-moving target may change so rapidly that the two dimensional system will never acquire the target in acquisition. By the time the scanner is manually directed to the indicated azimuth or elevation position, the target has moved to a new position so far from the indicated position that it cannot be located.

The time required for the acquisition process further restricts the use of a two coordinate radar system operating against targets moving in space. Even if a target is located, the remaining time available after performing acquisition, is so short in most cases that an effective attack is impossible.

Another serious handicap of a two dimensional system becomes readily apparent when considering the problem of selecting one of several targets. The operator cannot determine the flight path of the enemy from the usual two coordinate presentation. Thus, the most dangerous or most vulnerable target may be erroneously thought of as a target of lesser importance because of the lack of information given the operator.

These limitations serve to emphasize the importance of a system which will accurately present three coordinates of target position as provided by this invention and eliminate the handicaps inherent in a two coordinate presentation.

It is an object of this invention to provide a radar system which will accurately present three dimensional target information.

Another object of this invention is to provide a simple system of acquiring or "locking on" a target while presenting a dynamic picture to the operator.

Another object of this invention is to provide a radar system which is capable of locking on a selected target in a minimum of time.

Another object of this invention is to provide a radar unit which is light in weight and compact in design thereby being highly suitable for use in aircraft.

Further and other objects will become apparent from the accompanying description and drawings which form a part of this disclosure and in which like numerals refer to like parts.

Figure 1:
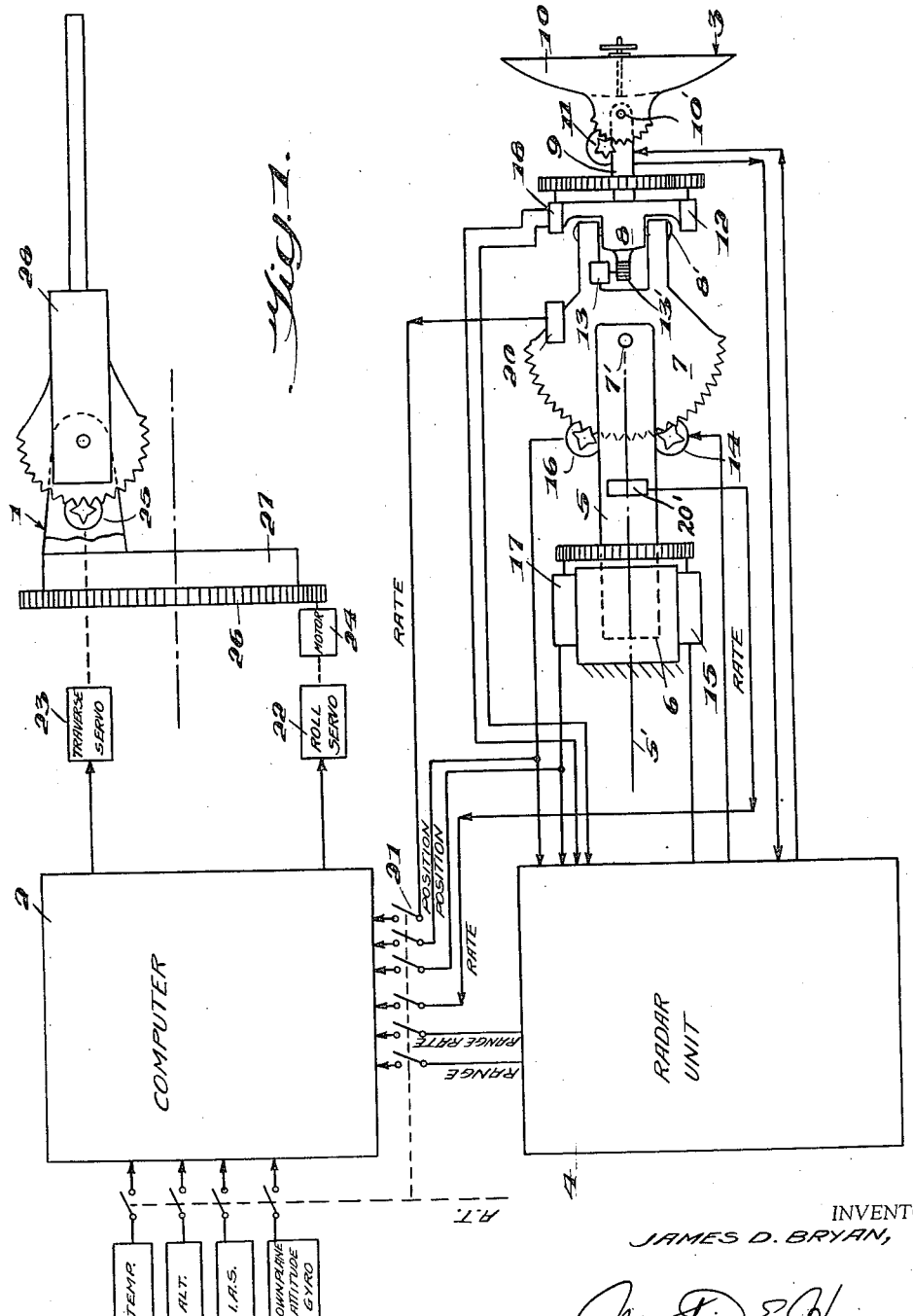
Figure 1 shows schematically the automatic fire control system embodying this invention.

The automatic fire control system shown in Figure 1 includes three basic units, turret 1, computer 2 and an automatic search and track radar illustrated in two parts as a scanner assembly 3 and a radar unit 4.

Scanner assembly 3 is rotatably carried through roll shaft 5 by bulkhead 6 forming a forward portion of an aircraft. The axis 5' of roll shaft 5 extends generally parallel with the aircraft's longitudinal axis. Traverse gear 7 is carried by roll shaft 5 through pin 7'. A sector coupling 8 is pinned at 8' to traverse gear 7 so as to be movable in a plane normal to the plane of movement of the traverse gear. Spin shaft 9 is rotatably carried by sector coupling 8. Scanner 10 is carried at the forward end of spin shaft 9, by means of pin 10'. Tilt drive 11 carried on spin shaft 9, is adapted to tilt scanner 10 with respect to the longitudinal axis of the spin shaft. Spin motor 12, carried on sector coupling 8 rotates spin shaft 9 and scanner 10. Sector motor 13 drives a rack on sector coupling 8 through pinion 13' to shift the longitudinal axis of spin shaft 9 in a plane normal to the plane of movement of traverse gear 7, thus allowing the scanner to cover sectors above and below the dead-ahead position. Traverse gear 7 is driven by traverse drive 14 carried on roll shaft 5. Roll drive 15 controls the rotation of roll shaft 5.

The scanner assembly is adapted to perform under three basic radar functions, identified as, search, acquisition and track. During the search and acquisition functions, a predetermined area is covered in the forward hemisphere by movement of the scanner. During the tracking function the scanner "locks-on" and follows a selected target.

Figure 3:
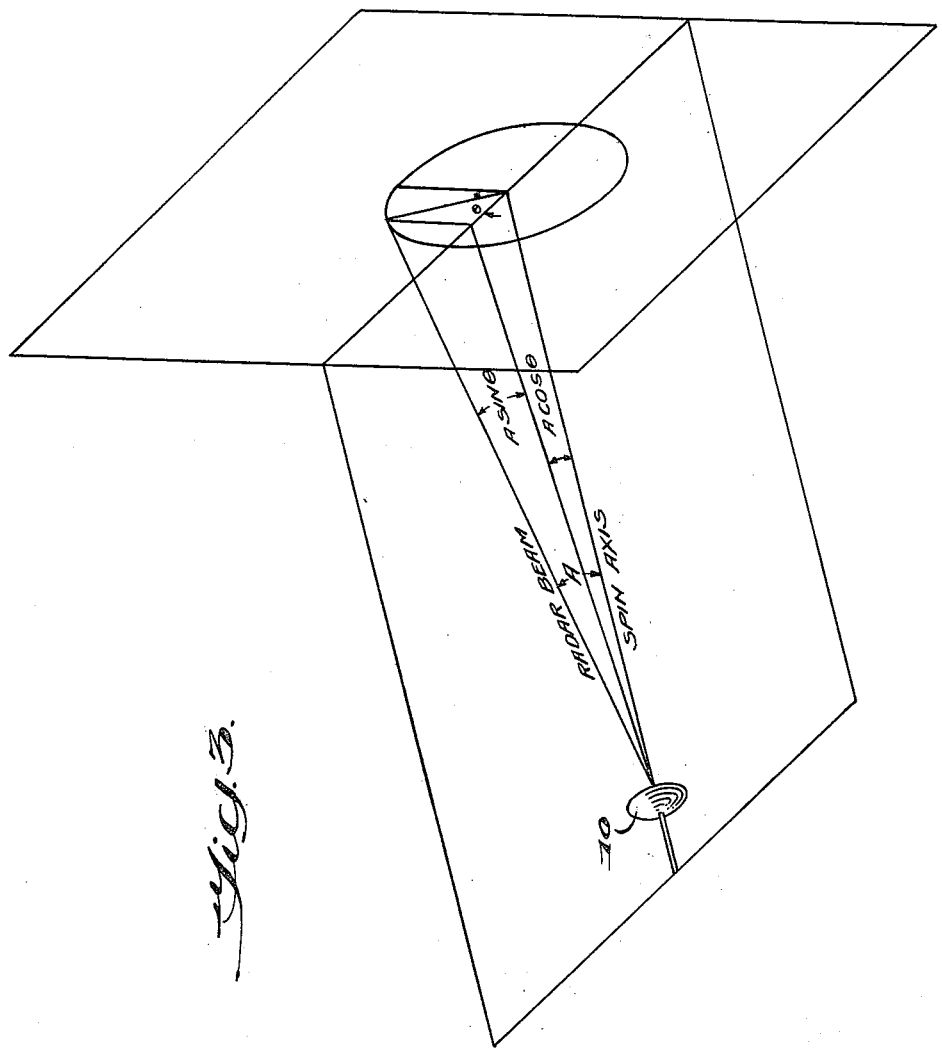
Figure 3 illustrates the geometry involved in ascertaining the angular position of a target due to tilting the scanner.

Roll shaft 5, during search and acquisition is held at zero roll position, which position may be defined as that which fixes the traverse movement in a plane generally parallel to the lateral axis of the aircraft. Traverse drive 14 moves scanner 10 in the traverse plane while traverse pick-off 16, carried on roll shaft 5, measures the instantaneous angular position of the longitudinal axis of spin shaft 9 with respect to axis 5' of roll shaft 5. Since scanner 10 is tilted relative to the spin axis as shown in Figure 3, the actual center line of the beam will not coincide with the spin axis but will instead form therewith an acute angle A, termed the tilt angle, lying in the plane including the spin axis and the center line of the radar beam. If the instantaneous angle between this last mentioned tilt plane and the traverse plane be termed θ, it can readily be shown that the traverse angle component that must be algebraically added to the traverse angle of the spin axis 9 relative to the roll axis 5' to give the true traverse angle of the beam at any particular instant is equal to $A \cos \theta$. It can equally readily be shown that the instantaneous vertical angular position of the beam relative to the traverse plane will equal $A \sin \theta$. To provide these angular data, an ordinary reference generator 18 is mounted on member 8 to measure $A \sin \theta$ and $A \cos \theta$ directly from the rotation of spin shaft 9.

Holding roll fixed in zero position, traverse, represented by the algebraic addition of the $A \cos \theta$ output of reference generator 18 and the output of traverse pick-off 16, becomes azimuth, and the vertical component $A \sin \theta$, from reference generator 18, becomes target elevation, assuming the longitudinal axes of roll shaft 5 and spin shaft 9 are in the same plane, a condition which is assumed throughout the description, for simplicity.

The scanner, operating in the tracking function, is allowed to move in roll through controlled rotation of roll shaft 5. The rotational movement is measured by roll pick-off 17. The relative target position in azimuth and elevation is accurately determined during this function from the roll and traverse pick-offs 16 and 17.

The outputs of the roll and traverse pick-off units as well as the outputs from the reference generator are fed into radar unit 4 through a suitable slip ring assembly (not shown) for indicating target position to the operator and controlling the roll and traverse drives.

Rate gyros 20 and 20' are carried on scanner assembly 3 to provide information regarding the rate of change of position in roll and traverse required of the scanner in order to track the target. The gyro outputs are fed to a computer 2 of conventional design, the construction and operation of which is well known in the art. In addition to the rate information the computer also receives target position data from the roll and traverse pick-offs, and range and range rate data from radar unit 4. To enable inclusion of ballistic error corrections, means are provided which give temperature, altitude, indicated airspeed and own-plane attitude data to computer 2. The computer only functions while a target is being tracked, therefore a plurality of switches 21 open the circuits feeding data to the computer until the radar has locked on the target.

The outputs from computer 2 are fed into roll and traverse servos 22 and 23 which drive motors 24 and 25 to direct the guns. Motor 24 drives roll gear 26 on mounting ring 27 for causing roll about the turret axis. Gun 28 is pivotally carried on mounting ring 27 and is adapted to be moved in traverse by motor 25.

Figure 2:
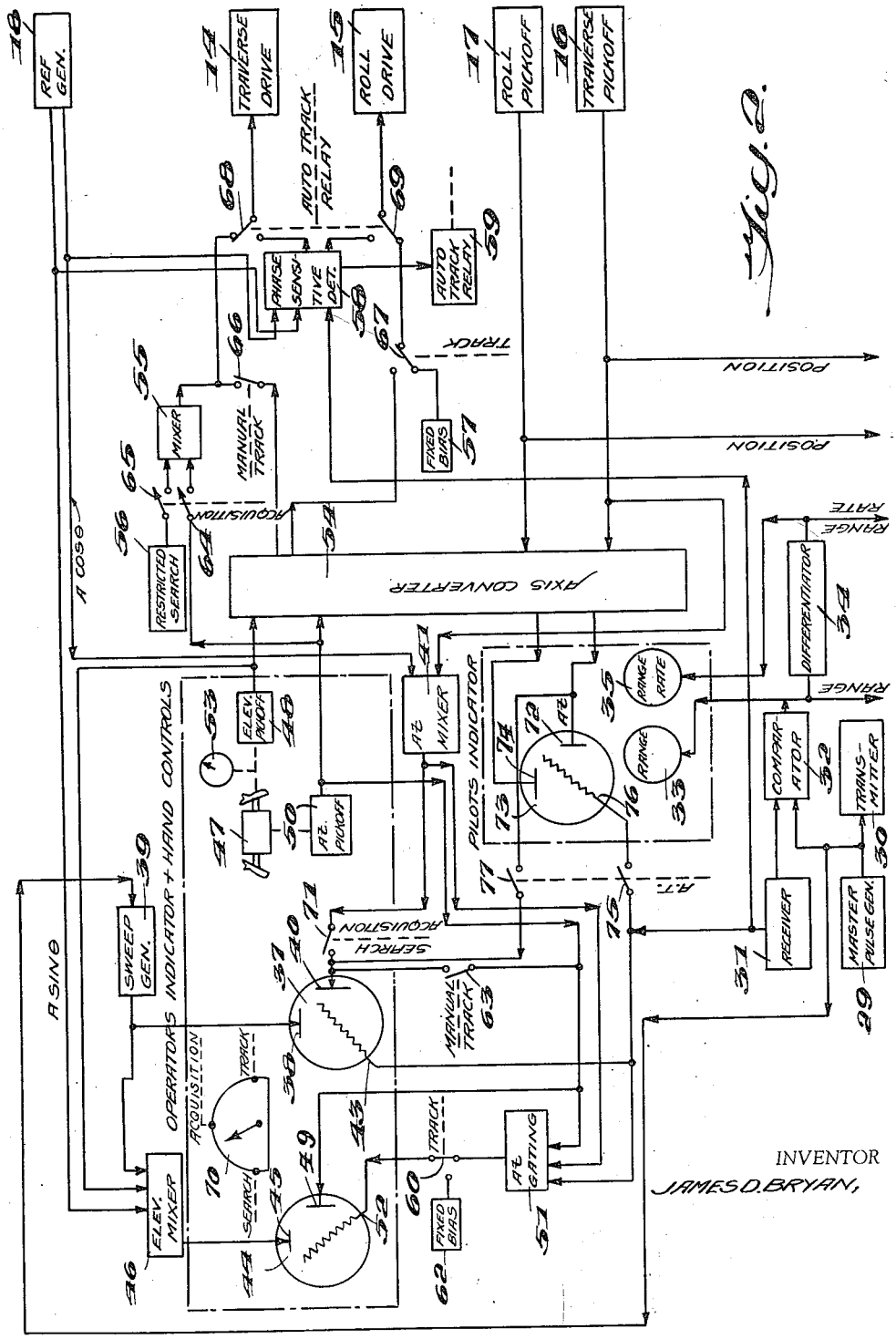
Figure 2 is a schematic drawing showing the radar circuit in block diagram form.

The radar unit 4 shown schematically in Figure 2 includes master pulse generator 29, which controls the pulsating radar output signal transmitted by transmitter 30 through scanner 10. Receiver 31 of radar unit 4 receives the pulses which have been reflected by a target and picked up through scanner 10. The output of master pulse generator 29 is fed into a comparator 32 and compared on the basis of time with the received pulse from the output of receiver 31. The time difference between transmitting and receiving a pulse, fixes the range of a target. The range data output of comparator 32 is fed into a pilot's range meter 33, into a differentiator 34 and also to computer 2. By differentiating the range signal as indicated by differentiator 34, range rate data may be obtained. The range rate is fed to a pilot's range rate meter 35 and to the computer.

Figure 4:
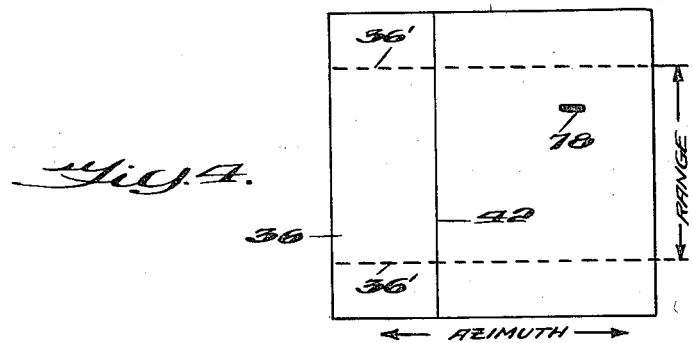
Figures 4, 5 and 6 illustrate indicator presentations at various stages of target acquisition.
Figure 5:
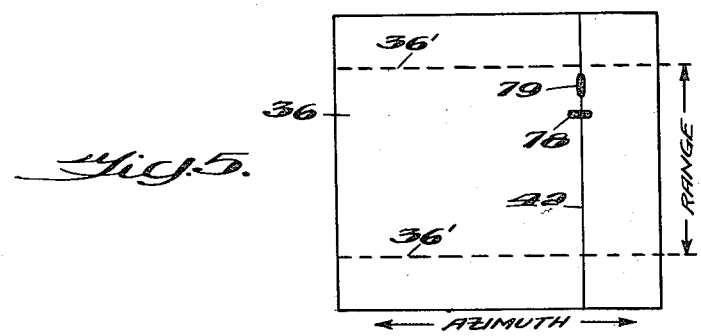
Figure 6:
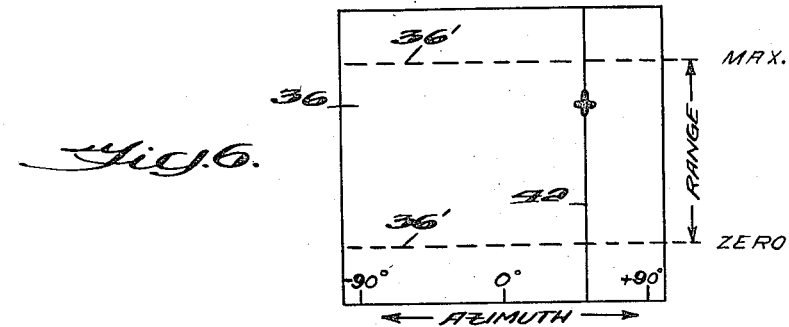

Gun 37 of a two gun cathode ray tube provides a presentation of azimuth and range as target coordinates on the face of the tube herein generally referred to as the operator's indicator 36 shown in Figures 4, 5 and 6. A saw-tooth range voltage from sweep generator 39 is applied to vertical plates 38 of gun 37 to locate the target in range on indicator 36. The sweep generator is controlled by master pulse generator 29. The horizontal plates 40 of gun 37, while the scanner roll position is zero, receive their signal voltage from an azimuth mixer 41 which algebraically adds signal voltages from reference generator 18 and traverse pick-off 16. The signal voltage from the reference generator represents $A \cos \theta$, the traverse component of a target displaced from the longitudinal axis of spin shaft 9. The signal voltage from traverse pick-off 16 represents the traverse angle between the longitudinal axis of spin shaft 9 and the longitudinal axis of roll shaft 5. Since when the scanner roll is at zero position, the traverse axis is normal to the plane of zero roll by definition, the traverse movement may be designated azimuth movement and the vertical movement, elevation, referenced from a plane designated by the aircraft longitudinal and lateral axes. Therefore by algebraic addition of the two traverse voltages, the signal output of azimuth mixer 41 will accurately represent the relative azimuth position of the target. The output of receiver 31, generally referred to as the video signal, is fed directly to grid 43 of gun 37 to produce a target pip 78 on indicator 36. The location of this pip in range and azimuth is controlled by the horizontal and vertical deflection plates hereinbefore described.

Gun 44, the second gun of the cathode ray tube, generates a vertical marker 42 across the face of indicator 36 as shown in Figures 4 through 6 by modulating the vertical position of the range sweep on gun 44 by the scanner angular elevation, $A \sin \theta$. The dash lines 36' on indicator 36 represent the effective range of the radar system. The length of marker 42 due to the range input is equal to the distance between the dash lines. The increased length of the marker beyond the dash lines represents the elevation input. Vertical plates 45 of gun 44 generate the marker by receiving a signal voltage from elevation mixer 46 which algebraically adds the range sweep voltage from sweep generator 39 with the voltage from reference generator 18 which represents the angular elevation component of scanner position. In addition to those two inputs to elevation mixer 46, an elevation signal voltage generated by elevation pick-off 48 and varied in accordance with elevation movement of hand controls 47, produces a bucking signal voltage which may be made to balance target elevation signal voltage and thus effectively move the marker in range by an amount equal to the elevation component. Horizontal plates 49 of gun 44 receive a signal voltage from azimuth pick-off 50, the output of which is controlled by azimuth movement of hand controls 47. The voltage output of the azimuth pick-off is used to move marker 42 in azimuth across indicator 36. This voltage from azimuth pick-off 50 in addition to being fed to horizontal plates 49, is also fed to an azimuth gating circuit 51 and compared with a signal voltage from azimuth mixer 41 to control the passage of the video input from receiver 31. The two azimuth signal voltages prevent the passage of video to grid 52 until the difference between them is reduced to a certain predetermined minimum. This voltage difference may be observed on indicator 36 by noting the azimuth displacement of marker 42 with a target pip 78 produced by gun 37. When the marker 42 on indicator 36 is moved in azimuth by operating hand controls 47 within plus or minus 5° of the azimuth position of target pip 78, the video fed to the azimuth gating circuit 51 is allowed to pass therethrough to grid 52 which produces a second target pip 79 on marker 42 displaced in range from pip 79. The range displacement represents target elevation when the hand control elevation setting is zero. Marker 42 may be displaced in its vertical position by moving the hand controls 47 in elevation. Output voltages from elevation and azimuth pickoffs 48 and 50 may be thought of as representing angular coordinates of a sighting line, the direction of which is established by the position of hand controls 47.

The amount of elevation movement from zero position of the hand controls required to move marker 42 and its associated pip 79 into coincidence with pip 78 produced by gun 37, represents the elevation of the target and is read on elevation dial 53 by the operator. When the two target pips coincide, the output of azimuth pickoff 50 represents target azimuth position. These two outputs are fed into axis converter 54 for directing the scanner to the target position.

When the marker intersects pip 78, at the start of the acquisition function, the signal output from the azimuth pickoff 50 representing target azimuth position is mixed with a restricted search signal produced by an azimuth synchro and small motor 56, in mixer 55. The output of mixer 55 is fed to traverse drive 14 which is then caused to servo the scanner to the approximate azimuth position of the target and start it oscillating through a limited search sector plus and minus 17½° on either side of the target. The output from a fixed bias source 57, being fed to roll drive 17 maintains the roll position of the scanner fixed in zero position until the tracking function is begun.

When the two pips are made to coincide by operation of hand control 47, the elevation and azimuth pickoffs generate signal voltages representing target position to enter the tracking function. The output from azimuth pickoff 50 of hand control 47 is fed to horizontal plates 40 of signal gun 37. A phase sensitive detector 58 receives a video signal from the output of receiver 31 and reference signals from reference generator 18. The phase sensitive detector compares these inputs representing the magnitude and direction of target position error on the basis of the phase difference between the video signal and the signals from the reference generator to produce roll and traverse correction signals. The traverse output of phase sensitive detector 58 is fed to traverse drive 14, and the roll output is fed to roll drive 15 to center the signal beam on the target. An automatic track relay 59 also receives a signal from phase sensitive detector 58. When the error signals going to the roll and traverse drives have been reduced to a predetermined value, relay 59 is energized to operate switches for automatic tracking.

Operator's indicator and hand control unit includes switch mechanism 70 arranged for selecting each of the three basic radar functions specifically identified earlier as search, acquisition and track. The search function is employed for seeking a target, the acquisition function prepares the system for tracking the target and the track function locks the radar beam on the target and provides target information to the computer for directing the guns.

When the radar is operating in its search function, the guns remain in stowed position. Spin shaft 9 is moved in traverse plus or minus 70° by traverse drive 14 as controlled by a limit switch. Scanner 10 is tilted about the longitudinal axis of spin shaft 9 so as to direct the transmitted signals within a 5° band generally 17½° from the longitudinal axis of the spin shaft. This produces a search coverage of plus or minus 90° in azimuth and plus or minus 20° in elevation. By operation of sector motor 13, the 40° elevation search sector may be shifted from dead ahead, up or down 20°. Spin motor 12 rotates spin shaft 9 and scanner 10 to generate an open center Palmer type scan. Throughout this searching function, the scanner is transmitting pulses produced by master pulse generator 29 and transmitter 30. All search inputs to the operator's cathode ray tube are operating with only the vertical marker produced by marker gun 44 showing on the indicator. When the beam sent out through scanner 5 strikes a target, the target reflects a portion of that beam back to the scanner where it is detected by receiver 31. The video output signal is fed to the grid of gun 37 and to azimuth gating circuit 51. Pip 78 will then appear on the operator's indicator as produced by gun 37. Its location on the indicator is a function of target range and azimuth position. The operator immediately operates hand controls 47 to move marker 42, produced by gun 44, to the approximate azimuth position of pip 78 and then transfers the system from the search function to the acquisition function by operation of switch mechanism 70. Azimuth gating circuit 51 will allow the video to pass therethrough to grid 52 of gun 44 when marker 42 is moved to within approximately 5° of pip 78. A second pip 79 then appears on marker 42, displaced from the first pip in range. By moving hand controls 47 in elevation, marker 42 and its pip 79 may be displaced in range on the face of the indicator so that pip 79 is made to coincide with pip 78 produced by gun 37. At the beginning of the acquisition function, the output of azimuth pick-off 50 represents the approximate azimuth position of the target because hand control 47 was manipulated beforehand to move marker 42 to the approximate azimuth position of pip 78. Therefore by closing switch 64 and feeding the output of azimuth pick-off 50 to traverse drive 14, scanner 10 is servoed to the approximate azimuth target position. However, since the target may have a high relative velocity, a limited search may be necessary to prevent losing the target while aligning the two pips in preparation for tracking. Therefore a restricted search signal developed by the azimuth synchro and small motor 56 is mixed with the output of azimuth pick-off 50 in mixer 55 for generating a plus and minus 17½° synchro signal to traverse drive 14 to produce restricted search operation during acquisition, thereby presenting a dynamic picture to the operator. Switch 65 is operated simultaneously with switch 64 to close the circuit to mixer 55.

The need for azimuth gating circuit 51 during acquisition becomes obvious when several targets are picked up by the scanner. If video was allowed to pass directly to the grid of gun 44, the several target pips would appear on marker 42 and the operator would not be able to distinguish between the corresponding pips produced by gun 37 and hence would not be able to properly perform the necessary operations in acquisition.

After aligning pips 78 and 79, the operator, through switch mechanism 70, transfers the radar from acquisition to the tracking function which simultaneously reduces the scanner tilt angle by operation of tilt drive 7 so that receiver signal strength is more sensitive to target movement. The earlier stages of the tracking function are designated manual track because, for a short period of time, the scanner is directed by signal voltages from the hand control outputs. When the track function is entered into, switch 60 in the circuit running to grid 52 of gun 44, opens contact with the azimuth gating circuit 51 and closes contact with a fixed bias 62 which cuts off gun 44. Switch 67, until now maintaining zero roll position of the scanner, is moved into contact with the roll output of axis converter 54 allowing roll drive 15 to operate. Switch 71 opens the circuit from azimuth mixer 41 to horizontal plates 40 of gun 37 and closes switch 63 for feeding the output of the azimuth pick-off 50, controlled by hand controls 47, into horizontal plates 40. Since the hand controls 47 were adjusted to the target azimuth and elevation positions during acquisition, the azimuth pick-off signal represents relative target azimuth position, and will therefore present the correct target position on the screen of the cathode ray tube in azimuth and range.

Elevation and azimuth signal voltages from the elevation pick-off unit 48 and azimuth pick-off unit 50 are fed to axis converter 54 and converted into roll and traverse signals. Switches 64 and 65 which are closed during acquisition, open when the tracking function is begun and switch 66 closes to feed the axis converter traverse output to traverse drive 14. The roll signal output from the axis converter is fed directly to roll drive 15, as switch 67 closes the circuit therebetween and opens the circuit between fixed bias 67 and the roll unit which was previously held in zero position. Receiver 31 feeds its output signal to phase sensitive detector 58 where it is compared with the instantaneous angular position of the scanner as developed in reference generator 18. The alternating current component of the receiver signal being fed to the phase sensitive detector is of sinusoidal wave form, the amplitude of which is directly proportional to the displacement error of the target. By comparing the phase of the alternating current component of the video signal with that of $A \sin \theta$ and $A \cos \theta$, the reference generator's outputs, the detector produces correction voltages to operate the scanner roll and traverse drives for centering the radar signal beam on a selected target during automatic tracking. When the amplitude of the A. C. component of the received signal reaches a certain minimum or, synonomously, when the scanner has servoed to the target, an output from the phase sensitive detector 58 energizes the auto-track relay 59 and closes switches 68 and 69, connecting the outputs of the phase sensitive detector with the roll and traverse drives and opens manual track switch 66 to enter automatic tracking. Correction signal voltages are obtained during the tracking function whenever the axis generated by the radar beam does not intersect the target.

When automatic track relay 58 is energized at the beginning of automatic tracking, signals from the roll and traverse pick-off units which represent target position are fed to axis converter 54, where they are converted to azimuth and elevation outputs. The azimuth output of the axis converter is fed to horizontal plates 72 of a pilot's cathode ray tube 73. The elevation output of the axis converter is fed to vertical plates 74 of tube 73. Switch 75 closes a circuit between receiver 31 and grid 76. The pilot then has an indicator presentation in azimuth and elevation to aid him in orienting own-plane position advantageously with respect to target position for a more effective attack. Range and range rate information are also made available to the pilot. Switch 77 is closed and switch 63 is opened by the automatic track relay to feed azimuth position data from the axis converter to the horizontal plates of gun 37 in substitution for data from azimuth pick-off 50.

During automatic track, target azimuth and range information is given on the operator's cathode ray tube, and target azimuth and elevation position is given on the pilot's cathode ray tube. Computer input circuits are closed by switches 21, operated by automatic relay 59. The roll and traverse position of the scanner generated by roll pick-off 17 and traverse pick-off 16 are fed to the computer 2, providing target position data for the gun orders. Rate gyros 20 and 20' carried on scanner assembly 3 provide rate of change of position information to computer 2 for calculating the required kinematic lead of the guns. Ballistic lead corrections are made in computer 2 in accordance with input voltages representing air temperature, altitude, indicated airspeed and own-plane attitude. The gun roll and traverse orders are fed from the computer to roll and traverse servos 22 and 23 which drive the roll and traverse motors on the turret.

Though the system has been described herein as an aircraft installation, it is obviously equally well adaptable wherever three dimensional sighting systems are desired.

Also it is believed obvious that while in the above described system target range and elevation cordinants have been represented by displacements of the pips in the same direction from a reference line, this is for illustration only and that any desired pair of coordinates could be thus combined without departing from the principle of this invention.

Also by the use of conventional electronic switching circuits a single gun cathode ray tube could be substituted for the two-gun tube shown herein to provide the three-dimensional target data as described above. The system is similarly readily applicable to radar apparatus having entirely different types of scanning.

Other substitution and modification will be obvious to those skilled in the art and may be made without departing from the spirit and scope of this invention as defined in the appended claims.

I claim as my invention:

1. A sighting station comprising radar apparatus including scanning mechanism for determining the azimuth, elevation and range coordinates of a target relative to said station, a cathode ray tube controlled by said radar apparatus for indicating the azimuth and range of said target by means of a target pip on the face thereof, the displacement of which relative to predetermined reference axes corresponds to the azimuth and range of said target, manual control means for establishing a sighting line independent of said scanning mechanism, said cathode ray tube including means responsive to said control means for generating an azimuth marker line on said tube face parallel to and displaced from said azimuth reference axis in accordance with the azimuth angle of said sighting line, means including gating means responsive to operation of said control means so as to move said marker to a position intersecting said pip for producing a second pip thereon, the displacement of said second pip from the range reference axis being controlled by the range and elevation of said target and the elevation of said sighting line whereby the displacement between said pips will correspond to the angular difference in elevation between said target and said sighting line, said control means being movable to shift said second pip so as to coincide with said target pip whereby said sighting line will intersect said target.

2. A radar sighting system comprising pulse transmitting and receiving means including a scanner adapted to direct said pulses as a beam moving in space, means producing a deflection voltage corresponding to an instantaneous angular coordinate of said beam relative to a sighting line, means producing a saw-tooth deflection voltage at the pulse repetition rate of said transmitter, a two gun cathode ray tube having beam deflecting means associated with each gun, means for applying said saw-tooth deflection voltage to the beam deflecting means of one of said guns, said gun being responsive to a return pulse for producing a pip on the face of said tube, the displacement of which from a reference axis corresponds to the instantaneous range of a target, means connected to said saw-tooth and beam deflection voltage producing means for combining and simultaneously applying said saw-tooth voltage and said beam deflection voltage to the corresponding deflection means of said other gun, said other gun also being responsive to said return pulse whereby a second pip will be produced, the distance between said pips measured in the direction of said displacement corresponding to the angular coordinate of said target relative to said sighting line.

3. A radar system comprising pulse transmitting and receiving means, means generating pulse position data representing instantaneous pulse locations, a cathode ray tube, means controlled by said pulse position data and responsive to a return pulse for generating a pip on the face of said tube, the displacement of said pip from a zero coordinate reference on the face of said tube representing one coordinate of relative target position, said last mentioned means generating a marker on the face of said tube, manually operable means generating bucking pulse position data, the position of said marker on said tube being controlled by said manually operable means, gating means controlled by said pulse position data and said bucking pulse position data and responsive to a return pulse for generating a marker pip, the distance between said first mentioned pip and said marker pip along said marker representing the axial displacement of said marker and a second coordinate of relative target position whereby the output from said manually operable means represents said second coordinate of target position when said marker pip is positioned to intersect said first mentioned pip.

4. A radar sighting system comprising pulse transmitting and receiving means including a scanner adapted to direct said pulses as a beam moving in space, means producing a first deflection voltage corresponding to the instantaneous elevation angle of said scanner and beam relative to a reference axis, means producing a saw-tooth deflection voltage at the pulse repetition rate of said transmitting means representing the instantaneous position of said pulses in range, a two gun cathode ray tube having beam deflecting means associated with each gun, means for applying said saw-tooth deflection voltage to the beam deflecting means of one of said guns, said gun being responsive to a return pulse for producing a pip on the face of said tube, the displacement of which from a predetermined reference axis corresponds to the instantaneous range of said target, variable control means generating an output voltage representing the elevation coordinate of a sighting line relative to said reference axis, and means for simultaneously applying said saw-tooth voltage, said first deflection voltage and said sighting line voltage to the corresponding deflecting means of said other gun whereby to produce a second pip which is displaced in range from said first mentioned pip by an amount equal to the elevation coordinate of said target relative to said sighting line.

5. A radar sighting system adapted to present three dimensional target position data while scanning comprising pulse transmitting and receiving means including a scanner, a cathode ray tube, means responsive to a return pulse for generating a pair of pips on the face of said tube, means controlled by said transmitting and receiving means for locating said pips on said face to represent three coordinates of relative target position, and variable control means generating outputs representing coordinates of a sighting line for moving one of said pips into coincidence with the other of said pips whereby the coordinates of said sighting line represent coordinates of relative target position for directing said scanner toward said target for tracking.

6. A radar sighting system comprising pulse generating means, an antenna adapted to systematically direct said pulses as a beam to various positions in space and receive said pulses reflected by a target, antenna position measuring means generating azimuth and elevation outputs representing the angular displacement of said beam as two coordinates measured from given reference axes, a sweep generator responsive to said pulse generating means and generating an output representing the instantaneous range of said pulses, a two gun cathode ray tube, one gun of said tube being responsive to a return pulse for producing a pip on the face thereof and to an output from said sweep generator and to the azimuth output from said antenna position measuring means for positioning said pip on the face of said tube so as to represent the azimuth and range coordinates of relative target position, manually controlled means generating azimuth and elevation outputs representing coordinates of a sighting line relative to said reference axes, a mixer responsive to an output from said sweep generator, to the elevation output from said antenna position measuring means to the elevation output from said manually controlled means, the second gun of said cathode ray tube being responsive to said return pulse for producing a second pip on the face of said tube and to the output from said mixer to generate a marker on the face of said tube for positioning said second pip, the elevation output from said manually controlled means bucking the elevation output from said antenna position measuring means in said mixer for moving said marker and second pip in one direction relative to said first mentioned pip whereby the elevation output from said manually controlled means represents the elevation coordinate of said target relative to said reference axes when said marker is positioned so that said pips intersect a line normal to said marker, said second gun being responsive to the azimuth output from said manually controlled means for moving said marker and said second pip in a direction normal to said one direction on the face of said tube wherein the azimuth output from said manually controlled means represents the azimuth coordinate of said target relative to said reference axes when said marker is positioned to intersect said first mentioned pip, and means responsive to said outputs from said manually controlled means for directing said antenna towards said target.

7. A sighting station comprising radar apparatus including means generating outputs representing three coordinates of pulse position relative to said station, a cathode ray tube controlled by said radar apparatus for indicating two coordinates of relative target position by means of a target pip on the face thereof, the displacement of which relative to a pair of predetermined reference axes corresponds to said two coordinates, manual control means generating outputs representing coordinates of a sighting line relative to said station, said cathode ray tube including means responsive to said control means for generating a marker line on said tube face parallel to and displaced from one of said reference axes in accordance with an angular coordinate position of said sighting line, and means responsive to said radar apparatus and to operation of said control means so as to move said marker to a position intersecting said pip for producing a second pip thereon, the displacement of said second pip from the other of said reference axes being controlled by a third coordinate of relative target position, a corresponding coordinate of said sighting line and one of said two known target coordinates whereby the displacement between said pips will correspond to the angular coordinate difference between said third coordinate and the corresponding coordinate of said sighting line.

8. Radar apparatus adapted to present a dynamic picture to an operator during target acquisition comprising, pulse generating means, a scanner responsive to said pulse generating means and adapted for movement whereby to direct pulses from said generating means to selectively search a certain sector of space or to track a target, a cathode ray tube, pulse position measuring means for measuring the instantaneous coordinate position of said pulses, means associated with said apparatus and responsive to a return pulse from said target for producing a pair of pips on the face of said tube, the displacement of one of said pips from predetermined reference axes representing two coordinates of relative target position, means responsive to outputs from said pulse position measuring means representing one of said two coordinates and the third coordinate of pulse position for generating a marker on the face of said tube and controlling the position of the other of said pair of pips, variable control means generating outputs representing coordinates of a sighting line controlling the position of said marker and other pip, the outputs from said variable control means representing target coordinates when said pips are in predetermined relative positions, and means responsive to said outputs from said variable control means for directing said scanner toward said target for tracking.

References Cited in the file of this patent

UNITED STATES PATENTS

| | | |
|---|---|---|
| 2,433,002 | Norton et al. | Dec. 23, 1947 |
| 2,467,319 | King et al. | Apr. 12, 1949 |
| 2,480,829 | Barrow et al. | Sept. 6, 1949 |
| 2,545,754 | Thompson | Mar. 20, 1951 |
| 2,603,775 | Chipp | July 15, 1952 |